INVENTOR.
GENE O. SINEX
BY
Mason, Kolehmainen, Rathburn and Wyss
ATTORNEYS

June 22, 1965 G. O. SINEX 3,190,057
SEPARATOR FOR TREATING WELL FLUIDS
Filed Jan. 12, 1962 2 Sheets-Sheet 2

INVENTOR.
GENE O. SINEX
BY
Mason, Kolehmainen, Rathburn and Wyss
ATTORNEYS

United States Patent Office 3,190,057
Patented June 22, 1965

3,190,057
SEPARATOR FOR TREATING WELL FLUIDS
Gene O. Sinex, Farmington, N. Mex., assignor to American Tank and Steel Corporation, Farmington, N. Mex., a corporation of New Mexico
Filed Jan. 12, 1962, Ser. No. 165,885
1 Claim. (Cl. 55—313)

This invention relates to well fluid treating equipment and, more particularly, to a new and improved oil-gas or glycol-gas separator having a demister or mist extractor.

The fluids recovered from earth formations in the production of petroleum commonly include varying quantities of water and free or occluded gases as well as oil. These components of the well stream are separated at the well head by the use of separators and similar equipment, and the separated gases are collected and transported through pipelines to a consumer or user. To insure that the transmitted gases are substantially free of liquid and solid contents, the separating equipment usually includes one or more demisters in the path of flow of the separated gases for removing entrained solid and liquid particles.

These demisters comprise a wire mesh filter or screen through which the gas can flow and which are sufficiently dense to remove liquid and solid material from the gas stream. In some applications, a liquid contact medium is used to increase the efficiency of the removal operation. After the separation apparatus has been in use for a period of time, the demister elements occasionally become clogged with paraffins, ice or other solid particles with the result that the flow of gas is impeded or higher pressure drops are induced through the system.

It would be desirable to provide means in the separator equipment by which a clogged demister element could be removed and replaced. However, the size of the wire mesh demister element is such that cost of providing access means to the separator apparatus is prohibitive. As an example, the cost of providing an access opening and a removable closure for replacing a demister element in a 16 inch horizontal separator operating in the range of around 1000 p.s.i. would approach 20% of the net sales price of the separator unit. Accordingly, clogged wire mesh demister elements usually are pushed out of the way to permit the unimpeded flow of gas, and the separator apparatus operates without demister facilities until a major repair operation can be made.

Accordingly, one object of the present invention is to provide a new and improved oil-gas or glycol-gas separator.

Another object is to provide separator equipment including a removable demister.

Another object is to provide a separator of a construction that permits removal of a demister element without appreciably increasing the cost of the separator unit.

Another object is to provide a separator having a resilient demister element and an access opening of less than one half the size of the demister element through which the element can be inserted or removed.

A further object is to provide a separator apparatus using large contact area demisters in which the demister can be replaced through a small opening in the apparatus by forming the demister element of an integral mass of resilient and gas pervious material.

Another object is to provide a well fluid treating apparatus in which a demister assembly is provided by a body of compressible gas pervious material removably disposed between a pair of rigid perforate retaining members.

A further object is to provide a demister assembly including a flexible body of gas pervious material only partially enclosed by rigid perforate retaining members to permit the gas pervious material to be deflected when it becomes clogged to prevent excessive pressure drops in the system.

In accordance with these and many other objects, one embodiment of the invention comprises an oil-gas separator or other separating unit having a gas stream conveying means or vessel with a portion of a given cross-sectional area disposed between an inlet side and an outlet side for receiving a demister assembly. This assembly includes a pair of apertured or perforate retaining means spaced from each other in the direction of flow of the gas and occupying substantially the full cross-sectional area of the conveying means. The demister element is disposed in the chamber between the retaining means and comprises an integral mass of resilient gas pervious material having an area substantially the same as the cross-sectional area of the fluid conveying means or vessel.

The vessel or conveying means is provided with an access means including an opening communicating with the chamber or space between the retaining means through which the mass of material forming the demister element can be inserted or removed. The opening in the access means has an area that is no more than one half of the cross-sectional area occupied by the demister element. However, the mass of material forming the demister element can be compressed to at least one half of its normal expanded area to permit it to be inserted and removed through the small area opening in the access means. The small opening required by the access means of the present invention can be provided in a separator apparatus at a nominal cost, and the use of this small area access opening in combination with the compressible, resilient mass of gas pervious material permits the construction of an oil-gas or glycol-gas separator in which demister elements of the size normally used can be readily replaced without increasing the cost of the separator unit.

In another oil-gas or glycol-gas separator embodying the invention, the retaining means do not extend completely across the cross-sectional area of the fluid conveying means or vessel so that a portion of the flexible body of gas pervious material is not rigidly retained or supported against displacement or deflection in the direction of flow of the gas. When the gas pervious material becomes clogged, the unsupported segment of the material can be deflected or displaced by the stream of gas to prevent the establishment of an excessive pressure drop until such time as the clogged demister element can be replaced.

Many other objects and advantages of the present invention will become apparent from considering the following detailed description in conjunction with the drawings in which.

Figure 1:
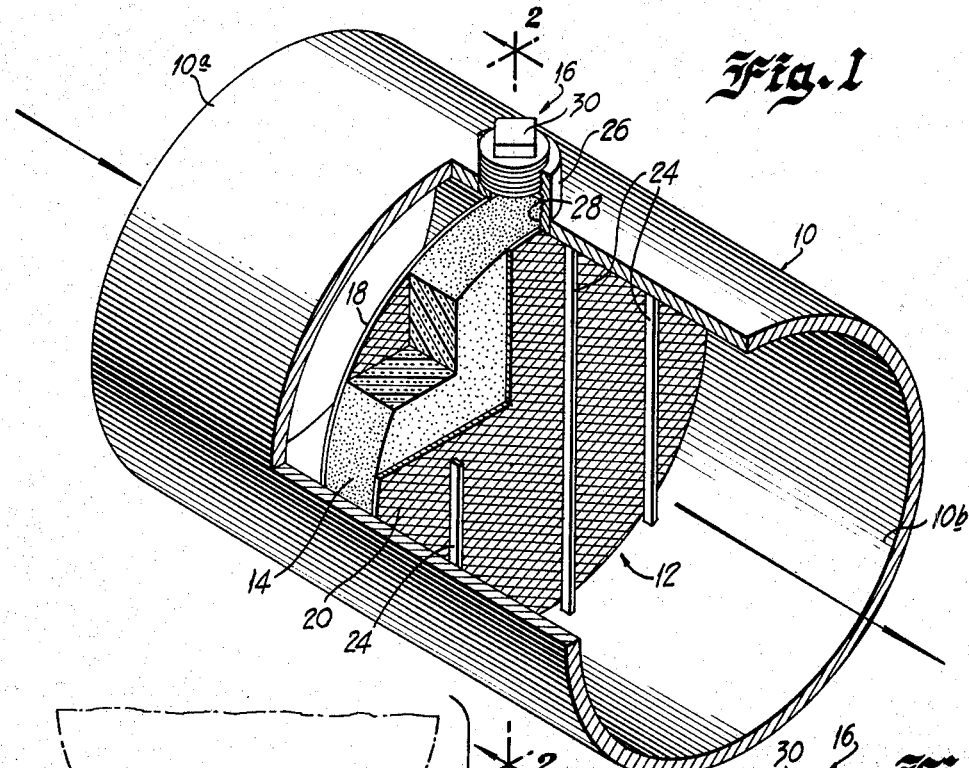
FIG. 1 is a perspective view, in partial section, illustrating a demister assembly embodying the present invention.
Figure 2:
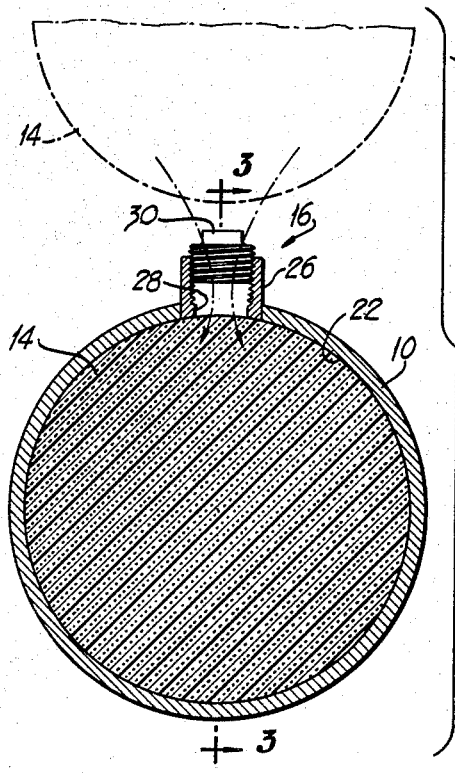
FIG. 2 is a sectional view taken along line 2—2 in FIG. 1.
Figure 3:
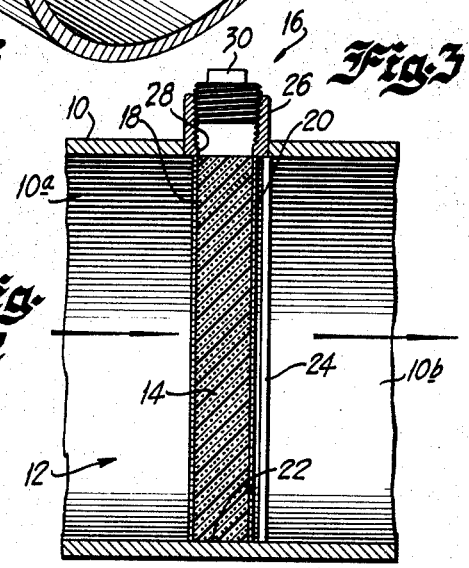
FIG. 3 is a sectional view taken along line 3—3 in FIG. 2.

Referring now more specifically to FIGS. 1–3 of the drawings, therein is shown a portion of a separator unit including a generally cylindrical fluid conveying pipe or vessel 10 in which is disposed a demister assembly, indicated generally as 12. The demister assembly 12 includes a demister element 14 of resilient, gas pervious material that occupies substantially the entire cross-sectional area of the gas conveying pipe 10 interposed between an inlet side and an outlet side. The element 14 permits gas to flow through the pipe 10 while removing liquid and solid particles therefrom. Whenever the element 14 becomes clogged or blocked so as to impede the flow of gas through the conveying means 10, an access assembly indicated generally as 16 is opened and the demister element 14 is compressed to permit its removal through the relatively small opening, when compared to the cross-sectional area of the conveying means 10, provided by the access means 16. Thus, the combination of the resilient large area demister element 14 and the small access means 16 permits the low cost construction of an oil-gas separator with removable demister means.

As indicated above, the fluid conveying means 10 is interposed between the point at which the gases are separated from the well fluids and the point at which the gases are collected or transmitted. In the drawing, the fluid conveying means 10 is illustrated as a cylindrical element having an inlet end 10a and an outlet end 10b with an intermediate portion of a given cross-sectional area in which the demister assembly 12 is positioned. The conveying means 10 can be formed integral with the separator vessel and can be disposed in a vertical or a horizontal position.

The demister assembly 12 includes a pair of rigid and perforate or apertured plates 18 and 20 spaced from each other in the direction of flow of the gas through the conveying means 10 along the axis thereof to define a chamber or a space 22 for receiving the demister element 14. The retaining means 18 and 20 can comprise expanded metal screens which are secured in fixed positions within the fluid conveying means 10. A plurality of metal bars 24 are disposed adjacent the rigid retaining means or screen 20 at the outlet side of the demister assembly 12.

The demister element 14 comprises an integral mass of resilient gas pervious material that is both flexible and compressible. The demister element 14, which is illustrated in the drawings as comprising a solid cylinder, is disposed in the chamber 22 interposed between the retaining elements 18 and 20 which provide physical supports for maintaining the element 14 in a desired position substantially filling the cross-sectional area of the fluid conveying means 10. One material that has been found to be satisfactory for use in the demister element 14 is a mass of 10-20 pore polyurethane foam manufactured by the Scott Paper Company of Chester, Pennsylvania. This cellular material does not offer objectionable resistance to the flow of gases therethrough, does not react with hydrocarbons, and is not adversely affected in the temperature range between 160° F. to 180° F. commonly encountered in this type of separator. In addition, this material is oil saturable.

The access means or assembly 16 through which the demister element 14 in the assembly 12 is inserted and removed includes an internally threaded sleeve or pipe coupling 26 that is rigidly secured within an opening in the wall of the conveying means 10. The sleeve 26 provides an access opening 28 into the chamber 22 in which the element 14 is positioned that is substantially smaller in area than the cross-sectional area of the fluid conveying means 10 occupied by the demister element 14. The area of the opening 28 preferably falls within a range between one half and one fiftieth of the cross-sectional area of the conveying means 10. The opening 28 is normally closed by a threaded plug or removable closure element 30 that is threadedly received within the coupling or sleeve 26.

When the demister element 14 is to be inserted into the chamber 22, the closure 30 is removed from the coupling 26, and the element 14 is rolled or compressed to a size approximating that of the opening 28. The element 14 is then inserted into the chamber 22 through the opening 28 and released. Upon release, the demister element 14 expands to its previous size and substantially completely fills the area disposed between the retaining elements 18 and 20. The access assembly 16 is then closed by threading the closure element 30 into the sleeve 26. The demister element 14 can easily be removed by removing the closure 30, compressing the demister element 14, and withdrawing it through the opening 28.

Thus, the combination of the resilient mass of gas pervious material forming the demister element 14 and the small area access means 16 permits the construction of gas treating equipment which permits the removal of the demister element and which does not substantially increase the cost of the unit. In one oil-gas separator constructed in accordance with the present invention, the demister element 14 comprises a 15 inch diameter and 2 inch thick integral mass of 10 pore polyurethane foam manufactured by the Scott Paper Company. The access means 16 is provided by a 2 inch threaded coupling. In this application, the ratio between the cross-sectional area of the vessel or fluid conveying means 10 and the area of the opening 28 is approximately 40 to 1. However, this ratio will vary in accordance with the types and sizes of the separating vessels.

Figure 4:
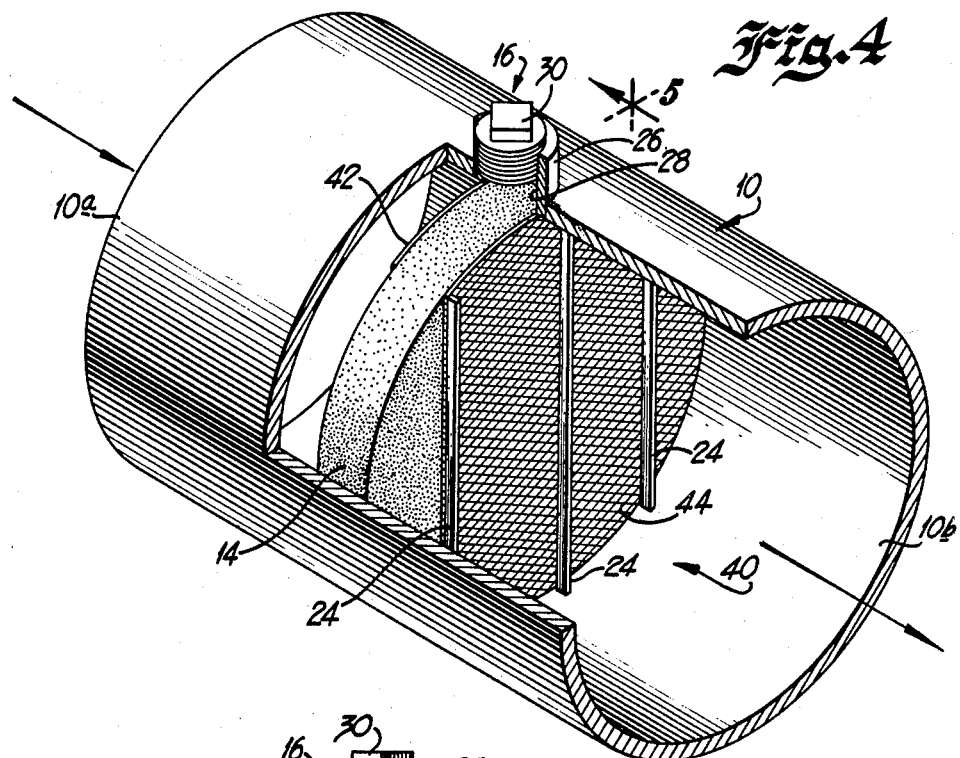
FIG. 4 is a perspective view, in partial section, of another demister assembly embodying the present invention.
Figure 5:
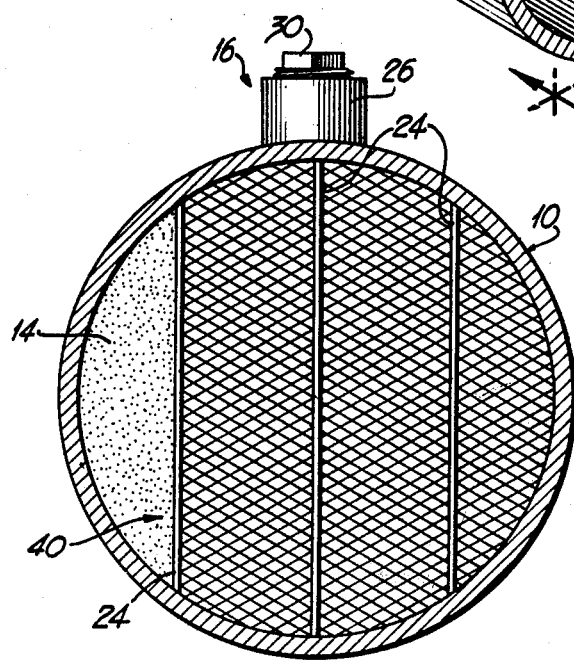
FIG. 5 is a sectional view taken along line 5—5 in FIG. 4.

FIGS. 4 and 5 of the drawings illustrate another oil-gas or glycol-gas separator unit which embodies the present invention and which includes means for automatically relieving any excessive pressure drop in the separator system due to a clogged demister element until such time as the demister element can be removed and replaced. The portion of the separator unit illustrated in FIGS. 4 and 5 of the drawings is substantially identical to the unit shown in FIGS. 1-3 and like reference numbers are used to identify identical components of the system. In general, the illustrated portion of the separator unit includes the fluid conveying pipe or vessel 10 having a demister assembly 40 disposed between the inlet portion 10a and the outlet portion 10b. The demister assembly 40 includes the body of gas pervious material 14 which substantially fills the cross-sectional area of the vessel 10 and which can be inserted and removed through the access assembly 16 by removing the closure plug 30.

However, the demister assembly 40 includes a pair of perforate and rigid retaining means 42 and 44 which do not extend completely across the fluid conveying means 10 but extend only partially across the diameter thereof. The retaining members 42 and 44 can comprise an expanded metal screen and preferably cover more than one half of the cross-sectional area of the fluid conveying means 10. The spaced retaining members 42 and 44 extend across enough of the cross-sectional area of the vessel 10 to locate the demister element 14 in a proper position when it is inserted through the access opening 28 but leave a portion of the element 14 unsupported in the direction of flow of the gas through the conveying means 10.

Therefore, if the demister element 14 becomes clogged during the operation of the separator unit, the flow of gas through the conveying means 10 is impeded and a pressure drop appears across this element. Whenever this pressure drop tends to become excessive, the pressure differential displaces the unsupported portion of the flexible and compressible body of material forming the element 14 in the direction of flow of the gas to permit the gas to flow around the clogged demister element 14. This construction automatically relieves any excessive pressure drop until such time as the clogged demister element 14 is replaced through the access assembly 16.

Although the invention has been described with reference to two illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

An apparatus for treating well fluids including gaseous components comprising a vessel, a gaseous component inlet to the vessel, a gaseous component outlet from the vessel spaced from the gaseous component inlet to provide a gaseous component flow path therebetween, a gas pervious retaining structure disposed between the inlet and the outlet and extending generally transverse to the flow path, said retaining structure comprising a pair of spaced apart gas pervious retaining means defining a cavity of a predetermined configuration having a first given dimension measured in a given plane transverse to the direction of flow and having a second given dimension measured in the direction of flow, access structure forming an access opening in the vessel communicating with the cavity and opening into the cavity between the spaced apart retaining means in a direction generally transverse to the flow path, said access opening having a first dimension measured in a plane parallel to said given plane and being substantially smaller than said first given dimension and having a second dimension measured in the direction of flow, said second dimension being not substantially greater than said second given dimension, an integrally formed and unitary body of flexible and compressible gas pervious material having a configuration and dimensions substantially the same as the cavity defined by the retaining structure, the integrally formed body being compressed and inserted through the access structure and permitted to expand within the cavity to substantially fill the cavity and provide an integral and unitary body of gas pervious material interposed in and extending completely across the flow path, said retaining structure defining an edge opening on the outlet side of the flow path considered relative to the body of gas pervious material into which the adjacent edge portion of the integrally formed and unitary body of gas pervious material is deflected when the pressure differential across the body exceeds a given level so that a flow path around the edge portion of the body is provided, and a removable closure for the access structure normally closing the access opening and removable to permit the body to be compressed and removed through the access opening.

References Cited by the Examiner

UNITED STATES PATENTS

| | | | |
|---|---|---|---|
| 37,500 | 1/63 | Fontain | 55—478 |
| 549,390 | 11/95 | Patterson et al. | 55—481 X |
| 1,916,907 | 7/33 | Sargent | 55—481 X |
| 2,907,405 | 10/59 | Marshall | 55—309 |
| 2,920,717 | 1/60 | Tuttle et al. | 55—504 X |
| 2,999,562 | 9/61 | Lechtenberg | 55—504 X |

HARRY B. THORNTON, *Primary Examiner.*

GEORGE D. MITCHELL, *Examiner.*